United States Patent
Kuo

(10) Patent No.: US 7,598,510 B2
(45) Date of Patent: Oct. 6, 2009

(54) SERIAL INTERFACE CONNECTING CIRCUIT FOR SUPPORTING COMMUNICATIONS BETWEEN DIFFERENT TYPES OF SERIAL INTERFACES

(75) Inventor: Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/778,085

(22) Filed: Jul. 16, 2007

(65) Prior Publication Data

US 2008/0152063 A1 Jun. 26, 2008

(30) Foreign Application Priority Data

Dec. 26, 2006 (CN) .......................... 2006 1 0201408

(51) Int. Cl.
*H01L 31/14* (2006.01)
*H03F 3/08* (2006.01)
(52) U.S. Cl. .................................. 250/551; 250/214 R
(58) Field of Classification Search ............. 250/214 R, 250/551, 214.1; 323/902; 398/130, 135, 398/138; 257/290, 295; 385/8, 14, 75
See application file for complete search history.

(56) References Cited

U.S. PATENT DOCUMENTS

| 4,961,205 | A | * | 10/1990 | Kuwaoka | 375/257 |
| 5,256,882 | A | * | 10/1993 | Miyasaka | 250/551 |
| 5,748,684 | A | | 5/1998 | Sanchez | |
| 6,977,540 | B2 | * | 12/2005 | Vandenberg et al. | 327/514 |
| 7,359,640 | B2 | * | 4/2008 | Onde et al. | 398/135 |
| 2004/0084640 | A1 | * | 5/2004 | Cheyne et al. | 250/551 |

* cited by examiner

*Primary Examiner*—Georgia Y Epps
*Assistant Examiner*—Pascal M Bui-Pho
(74) *Attorney, Agent, or Firm*—Frank R. Niranjan

(57) ABSTRACT

A serial interface connecting circuit includes a first IC (10) with a signal transmitting and a signal receiving terminal, a second IC (20) with a signal transmitting and a signal receiving terminal, and a connecting circuit (30) coupled between the first IC (10) and the second IC (20). The connecting circuit (30) includes a first photocoupler (16) having a first luminous element and a first optical receiving block, an anode of the first luminous element is coupled to a first power source (Vcc), a cathode of the first luminous element is coupled to the signal transmitting terminal of the first IC (10), a collector of the first optical receiving block is coupled to a second power source (Vdd) and the signal receiving terminal of the second IC (20), and an emitter of the first optical receiving block is coupled to ground.

5 Claims, 1 Drawing Sheet

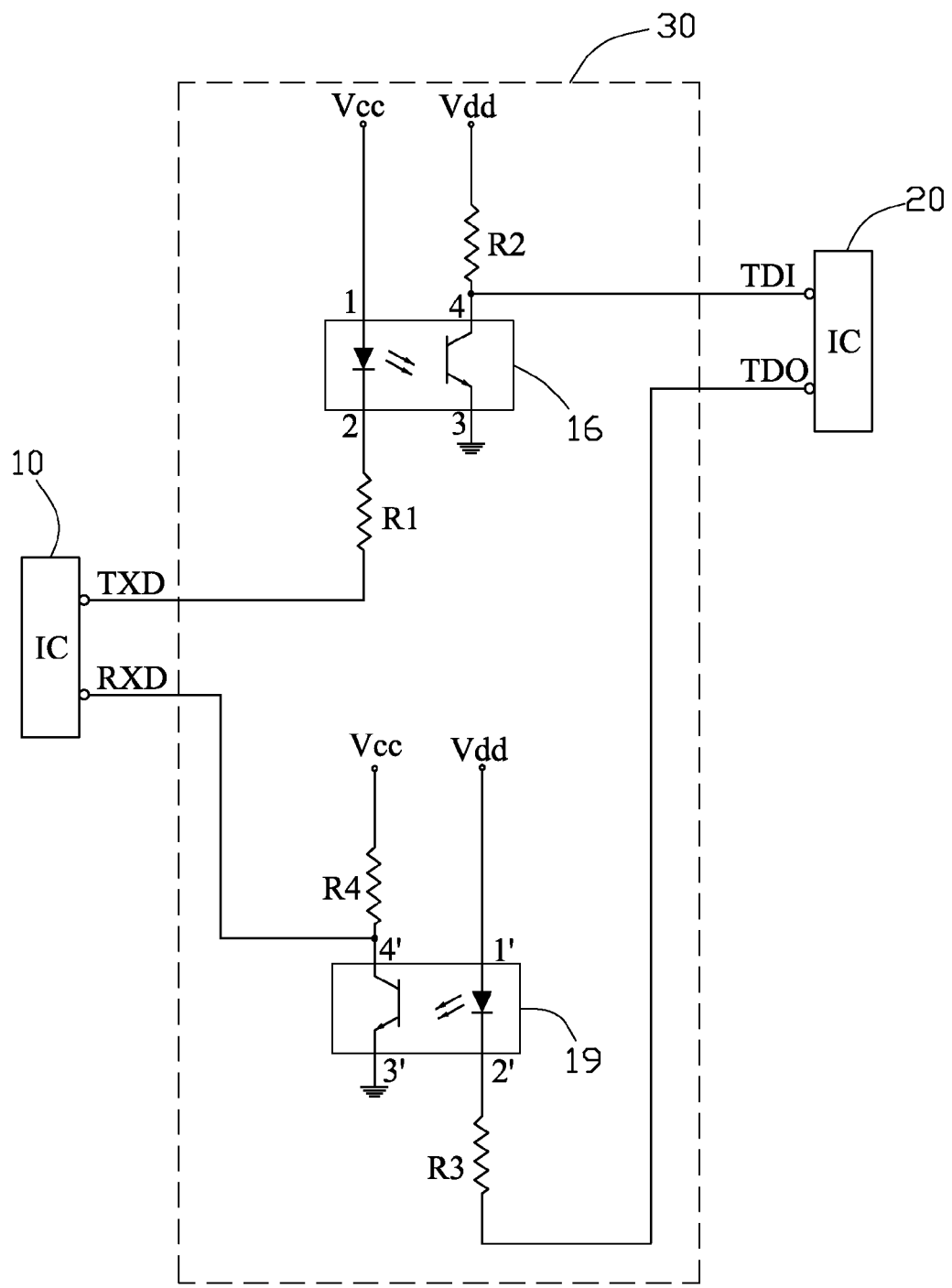

SERIAL INTERFACE CONNECTING CIRCUIT FOR SUPPORTING COMMUNICATIONS BETWEEN DIFFERENT TYPES OF SERIAL INTERFACES

BACKGROUND OF THE INVENTION

1. Field of the Invention

The present invention relates to serial interface connecting circuits, and particularly to a serial interface connecting circuit supporting communications between different types of serial interfaces.

2. Description of Related Art

Serial interfaces are desirable for connections between communications of Integrated circuits (ICs) that require relatively low data transfer rates because serial interfaces require few input/output pins. For example, Universal Asynchronous Receiver/Transmitter (UART) devices, Serial Peripheral Interface (SPI) bus devices, Inter Integrated Circuit (IIC) bus devices, and System Management (SM) bus devices usually use serial interfaces. However, the serial interfaces of different serial devices often have different electrical characteristics, so different transition circuits or ICs are needed to connect these serial devices, which increases costs of the devices.

What is needed, therefore, is a cost-saving serial interface connecting circuit.

SUMMARY OF THE INVENTION

An exemplary serial interface connecting circuit includes a first IC with a signal transmitting and a signal receiving terminal, a second IC with a signal transmitting and a signal receiving terminal, and a connecting circuit coupled between the first IC and the second IC. The connecting circuit includes a first photocoupler having a first luminous element and a first optical receiving block, an anode of the first luminous element is coupled to a first power source, a cathode of the first luminous element is coupled to the signal transmitting terminal of the first IC, a collector of the first optical receiving block is coupled to a second power source and the signal receiving terminal of the second IC, and an emitter of the first optical receiving block is coupled to ground.

Other objects, advantages and novel features of the present invention will become more apparent from the following detailed description of preferred embodiments when taken in conjunction with the accompanying drawings, in which:

BRIEF DESCRIPTION OF THE DRAWINGS

The drawing is a circuit diagram of one embodiment of a serial interface connecting circuit in accordance with the present invention.

DETAILED DESCRIPTION OF THE INVENTION

Referring to the drawing, a serial interface connecting circuit in accordance with an embodiment of the present invention includes a first IC 10 having a signal transmitting terminal TXD and a signal receiving terminal RXD, a second IC 20 with a signal transmitting terminal TDO and a signal receiving terminal TDI, and a connecting circuit 30 coupled between the first IC 10 and the second IC 20.

In this embodiment, the connecting circuit 30 includes a first photocoupler 16 having a first luminous element like an LED and a first optical receiving block. An anode 1 of the first luminous element is coupled to a first power source Vcc, and a cathode 2 of the first luminous element is coupled to the signal transmitting terminal TXD of the first IC 10 via a resistor R1. A collector 4 of the first optical receiving block is coupled to the signal receiving terminal TDI of the second IC 20, and a second power source Vcc via a resistor R2. An emitter 3 of the first optical receiving block is coupled to ground.

The connecting circuit 30 further includes a second photocoupler 19 having a second luminous element and a second optical receiving block. An anode 1' of the second luminous element is coupled to the second power source Vdd, and a cathode 2' of the second luminous element is coupled to the signal transmitting terminal TDO of the second IC 20 via a resistor R3. A collector 4' of the second optical receiving block is coupled to the signal receiving terminal RXD of the first IC 10, and the first power source Vcc via a resistor R4. An emitter 3' of the second optical receiving block is coupled to ground.

The first and second power sources Vcc and Vdd are respectively 12 volt and 5 volt DC sources for driving the first and the second photocouplers 16 and 19.

When the signal transmitting terminal TXD of the first IC 10 sends a high-level voltage signal through the connecting circuit 30, the first luminous element of the first photocoupler 16 is turned off and the first optical receiving block is turned off, therefore the signal receiving terminal TDI of the second IC 20 receives a high-level voltage from the second power source Vdd. When the signal transmitting terminal TXD of the first IC 10 sends a low-level voltage signal through the connecting circuit 30, the first luminous element of the first photocoupler 16 is turned on and the first optical receiving block is turned on, therefore the signal receiving terminal TDI of the second IC 20 receives a low-level voltage from ground. Thus, high-level or low-level voltage signals sent by the signal transmitting terminal of the first IC 10 can be received at the signal receiving terminal of the second IC 20, different level of voltage signals can be transmitted from the first IC 10 to the second IC 20 through the connecting circuit 30.

When the second IC 20 sends a feedback electrical signal to the first IC 10 via the connecting circuit 30, that is, when the signal transmitting terminal TDO of the second IC 20 sends a high-level voltage signal through the connecting circuit 30, the second luminous element of the second photocoupler 19 is turned off and the second optical receiving block is turned off, therefore the signal receiving terminal RXD of the first IC 10 receives a high-level voltage from the first power source Vcc. When the signal transmitting terminal TDO of the second IC 20 sends a low-level voltage signal through the connecting circuit 30, the second luminous element is turned on and the second optical receiving block is turned on, therefore the signal receiving terminal RXD of the first IC 10 receives a low-level voltage from ground. Thus, high-level or low-level voltage signals sent by the signal transmitting terminal TDO of the second IC 20 can be received at the signal receiving terminal RXD of the first IC 10, different level of voltage signals can be transmitted from the second IC 20 to the first IC 10 through the connecting circuit 30.

In this embodiment, the first IC 10 is a Serial Peripheral Interface (SPI) bus device, and the second IC 20 is a Universal Asynchronous Receiver/Transmitter (UART) device.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A serial interface connecting circuit comprising:
   a first Integrated circuit (IC) with a signal transmitting terminal and a signal receiving terminal;
   a second IC with a signal receiving terminal and a signal transmitting terminal; and
   a connecting circuit coupled between the first and second ICs for transmitting electrical signals between the first and second ICs, the connecting circuit comprising a first photocoupler having a first luminous element and a first optical receiving block, and a second photocoupler having a second luminous element and a second optical receiving block, an anode of the first luminous element being coupled to a first power source, a cathode of the first luminous element being coupled to the signal transmitting terminal of the first IC, a collector of the first optical receiving block being coupled to a second power source and the signal receiving terminal of the second IC, and an emitter of the first optical receiving block being coupled to ground; an anode of the second luminous element being coupled to a second power source, a cathode of the second luminous element being coupled to the signal transmitting terminal of the second IC, a collector of the second optical receiving block being coupled to the first power source and the signal receiving terminal of the first IC, an emitter of the second optical receiving block being coupled to ground.

2. The serial interface connecting circuit as claimed in claim 1, wherein voltage of the first power source is approximately 12 volts, and voltage of the second power source is approximately 5 volts.

3. The serial interface connecting circuit as claimed in claim 1, wherein a first resistor is coupled between the signal transmitting terminal of the first IC and the cathode of the first luminous element, and a second resistor is coupled between the second power source and the collector of the first optical receiving block.

4. The serial interface connecting circuit as claimed in claim 1, wherein a resistor is coupled between the signal transmitting terminal of the second IC and the cathode of the second luminous element, and another resistor is coupled between the first power source and the collector of the second optical receiving block.

5. The serial interface connecting circuit as claimed in claim 1, wherein the first IC is a Serial Peripheral Interface (SPI) bus device, and the second IC is a Universal Asynchronous Receiver/Transmitter (UART) device.

* * * * *